US008774411B2

(12) United States Patent
Cakulev et al.

(10) Patent No.: US 8,774,411 B2
(45) Date of Patent: Jul. 8, 2014

(54) SESSION KEY GENERATION AND DISTRIBUTION WITH MULTIPLE SECURITY ASSOCIATIONS PER PROTOCOL INSTANCE

(75) Inventors: Violeta Cakulev, Millburn, NJ (US); Semyon B. Mizikovsky, Morganville, NJ (US); Ganapathy S. Sundaram, Hillsborough, NJ (US)

(73) Assignee: Alcatel Lucent, Paris (FR)

( * ) Notice: Subject to any disclaimer, the term of this patent is extended or adjusted under 35 U.S.C. 154(b) by 1067 days.

(21) Appl. No.: 12/474,764

(22) Filed: May 29, 2009

(65) Prior Publication Data

US 2010/0303238 A1    Dec. 2, 2010

(51) Int. Cl.
| H04K 1/00 | (2006.01) |
| H04L 9/08 | (2006.01) |
| H04L 29/06 | (2006.01) |
| H04W 12/08 | (2009.01) |

(52) U.S. Cl.
CPC .......... H04L 9/0844 (2013.01); H04L 63/0428 (2013.01); H04W 12/08 (2013.01)
USPC .............................. 380/272; 380/44; 380/255

(58) Field of Classification Search
CPC ............................ H04L 9/0838; H04L 9/0844
USPC ........................................... 380/272, 255, 44
See application file for complete search history.

(56) References Cited

U.S. PATENT DOCUMENTS

| 2008/0039096 A1* | 2/2008 | Forsberg ....................... 455/438 |
| 2008/0069050 A1* | 3/2008 | Dutta et al. .................... 370/331 |
| 2008/0070577 A1* | 3/2008 | Narayanan et al. ........... 455/436 |
| 2008/0267407 A1* | 10/2008 | Vanderveen ................... 380/277 |
| 2009/0307496 A1* | 12/2009 | Hahn et al. ..................... 713/171 |
| 2010/0205442 A1* | 8/2010 | Han et al. ....................... 713/171 |

OTHER PUBLICATIONS

"E-UTRAN—e-HRPD Connectivity and Internetworking Core Network Aspects," 3GPP2, Apr. 1, 2009, pp. 1-154.*
3GPP2 Specification No. A.S0008-0 v4.0, "Interoperability Specification (IOS) for High Rate Packet Data (HRPD) Radio Access Network Interfaces with Session Control in the Access Network," May 2007, 136 pages.
3GPP2 Specification No. A.S0067, Generic Key Exchange Protocol for cdma2000 High Rate Packet Data Air Interface, Nov. 2005, 29 pages, Version 1.0.
U.S. Appl. No. 12/401,287, filed in the name of V. Cakulev et al. on Mar. 10, 2009 and entitled "Communication of Session-Specific Information to User Equipment from an Access Network."

(Continued)

Primary Examiner — Shewaye Gelagay
(74) Attorney, Agent, or Firm — Ryan, Mason & Lewis, LLP

(57) ABSTRACT

A single instance of a session key generation protocol is executed in a manner that generates a plurality of security associations between user equipment and a first network element of a communication system. In one aspect, a first one of the security associations is utilized to secure data sent between the user equipment and the first network element in an ongoing communication. In conjunction with a handoff of the ongoing communication from the first network element to a second network element of the communication system, another one of the security associations is selected, and the other selected security association is utilized to secure data sent between the user equipment and the second network element in the ongoing communication. The security associations may comprise respective sets of session keys derived from a single pairwise master key.

23 Claims, 7 Drawing Sheets

(56) References Cited

OTHER PUBLICATIONS

3GPP2 Specification No. X.S0067-A, "Key Exchange Protocols for cdma2000 High Rate Packet Data Air Interface," Feb. 2009, 50 pages, Version 1.0.

3GPP2 Specification No. X.S0057-0, "E-UTRAN—HRPD Connectivity and Interworking: Core Network Aspects," 152 pages.

B. Aboba et al., IETF RFC 3748, "Extensible Authentication Protocol (EAP)," Jun. 2004, 67 pages.

J. Arkko et al., IETF RFC 4187, "Extensible Authentication Protocol Method for 3rd Generation Authentication and Key Agreement (EAP-AKA)," Jan. 2006, 79 pages.

J. Arkko et al., IETF Internet-Draft draft-arkko-eap-aka-kdf-10, "Improved Extensible Authentication Protocol Method for 3rd Generation Authentication and Key Agreement (EAP-AKA')," Nov. 18, 2008, 23 pages.

* cited by examiner

SESSION KEY GENERATION AND DISTRIBUTION WITH MULTIPLE SECURITY ASSOCIATIONS PER PROTOCOL INSTANCE

FIELD OF THE INVENTION

The present invention relates generally to communication systems, and more particularly to session key generation and distribution within such systems.

BACKGROUND OF THE INVENTION

Wireless communication standards continue to evolve. For example, in the cellular context, standards are currently evolving from third generation (3G) standards to fourth generation (4G) standards. The 3G standards include GSM and UMTS standards promulgated by an organization known as the 3G Partnership Project (3GPP) and CDMA2000 standards such as High Rate Packet Data (HRPD) promulgated by an organization referred to as 3GPP2. The 4G standards currently under development by 3GPP are generally referred to as Long Term Evolution (LTE) standards. The 3GPP and 3GPP2 specification documents, including, for example, 3GPP2 Specification No. A.S0008-0 v4.0, "Interoperability Specification (IOS) for High Rate Packet Data (HRPD) Radio Access Network Interfaces with Session Control in the Access Network," May 2007, are freely available online and are incorporated by reference herein in their entirety.

LTE networks will make use of an Internet protocol (IP) based packet core referred to as Evolved Packet Core (EPC). In order to facilitate the transition to LTE networks, 3GPP2 has developed what is referred to as enhanced HRPD (eHRPD), which allows HRPD access networks to utilize the LTE EPC. Such HRPD access networks are also referred to herein as eHRPD access networks.

The eHRPD approach utilizes an HRPD Serving Gateway (HSGW) to interface eHRPD access networks to the LTE EPC. The HSGW provides interworking between the eHRPD access networks and a Packet Data Network (PDN) of the EPC. For example, the HSGW may interface with a PDN gateway (PGW) of the EPC. The HSGW may be implemented as a separate network element, or alternatively may be viewed as comprising or being incorporated into a Packet Data Serving Node (PDSN) in the access network.

The 3GPP LTE standards generally require the use of a specially-formatted authentication protocol when allowing access to the EPC from a non-3GPP system such as an eHRPD access network. This authentication protocol is carried out between a mobile station or other user equipment associated with the non-3GPP system element and an authentication server of the EPC using an authenticator that in the eHRPD context typically comprises the HSGW. The authentication protocol generally involves key derivation in which keying material is bound to appropriate context information.

Conventional techniques for generating session keys upon successful completion of the authentication protocol are disclosed in 3GPP2 Specification No. C.S0067, "Generic Key Exchange Protocol for cdma2000 High Rate Packet Data Air Interface," Version 1.0, November 2005, which is incorporated by reference herein. A single iteration or "instance" of the GKE protocol generates single security association based on a Pairwise Master Key (PMK) as well as nonces that are exchanged between the mobile station, also referred to as an "access terminal," and an access network element such as a Radio Network Controller (RNC). The GKE protocol ensures that the access terminal and the access network element have the same PMK. The PMK may be derived from a Master Session Key (MSK) computed in conjunction with the authentication protocol.

A given instance of the GKE protocol requires a bidirectional exchange of nonces between the access terminal and the RNC. A corresponding session key is generated by applying a cryptographic Key Derivation Function (KDF) to a concatenation of the PMK with an access terminal nonce and an access network nonce.

The above-described conventional techniques can be problematic in the case of handoffs that may occur within a particular session. For example, there may be a handoff of an ongoing call from one base station to another base station as the mobile station moves within the system. It is also possible that there may be a handoff of an ongoing call from one RNC to another RNC, or from one HSGW to another HSGW.

In the case of a handoff from one base station to another, one possible approach is to repeat the authentication and GKE protocols for each such handoff. This is clearly undesirable in that it imposes additional computational burdens and can also introduce significant amounts of delay in completing the handoff.

Another possible approach is to generate one or more secondary session keys from a given primary session key associated with a single instance of the GKE protocol. Although this approach advantageously avoids repeating the authentication protocol and the GKE protocol for each handoff, it can undermine system security, as secondary keys are typically not as cryptographically strong as the primary keys from which they are derived. Furthermore, if the primary keys are compromised, all sets of secondary keys derived from those primary keys will also be compromised.

It is also possible to perform multiple instances of the GKE protocol to generate respective multiple security associations for a given authentication of the mobile station in advance of any handoffs. However, this approach is inefficient and may unduly limit the performance of the system.

A further drawback of conventional practice is that the various techniques mentioned above fail to adequately address the issue of handoffs between other network elements, such as from one RNC to another RNC, or from one HSGW to another HSGW.

Similar problems exist in numerous other communication system contexts, such as any system comprising visited network and home network gateways where mutually authenticated session key agreement protocols are utilized to establish session keys.

SUMMARY OF THE INVENTION

Illustrative embodiments of the present invention overcome the above-noted drawbacks of conventional practice by providing techniques in which a single instance of a conventional session key generation protocol such as the GKE protocol is modified to produce multiple security associations. This may be achieved in the illustrative embodiments by introducing a multiplier in an otherwise conventional session key generation protocol such as the GKE protocol so as to generate a pseudorandom string which is a function of the multiplier and whose length is equal to the multiplier times a standard length, thereby providing multiple session keys of equal length and equal security. Furthermore, the use of a multiplier in combination with a pseudorandom function eliminates the need for additional randomness yet increases the output string length with little or no loss in security. The techniques can be implemented in a simple and efficient manner within the framework of existing protocols, and thus without the need for substantial changes to the standards.

In accordance with one aspect of the invention, a single instance of a session key generation protocol is executed in a manner that generates a plurality of security associations between user equipment and a first network element of a communication system. A first one of the security associations is utilized to secure data sent between the user equipment and the first network element in an ongoing communication. In conjunction with a handoff of the ongoing communication from the first network element to a second network element of the communication system, another one of the security associations is selected, and the other selected security association is utilized to secure data sent between the user equipment and the second network element in the ongoing communication. The security associations may comprise respective sets of session keys derived from a single pairwise master key. Advantageously, the session key generation protocol is configured such that there is no significant security compromise between the first and subsequent security associations.

The selection of a different security association in conjunction with the handoff may be performed in the user equipment responsive to a message received from at least one of the first and second network elements. The message may specify a value of a first index identifying a particular instance of the session key generation protocol and a value of a second index identifying a particular security association associated with the particular instance of the session key generation protocol.

The session key generation protocol may comprise an otherwise conventional GKE protocol or other type of protocol that is modified to generate the multiple security associations but absent that modification would otherwise generate only a single security association for a given single instance of the protocol.

An example of such a modified protocol in an illustrative embodiment of the present invention is referred to as Multi-Key Key Exchange Protocol (MKEP). Other embodiments may utilize other types of session key generation protocols to implement the invention.

The modified version of the protocol may apply a multiplier to key material to increase a length of that key material by a factor given by the multiplier. The multiplier may thus specify a total number of security associations produced by execution of the single instance of the session key generation protocol.

In one illustrative embodiment, the first and second network elements comprise respective serving and target base stations and the handoff is from the serving base station to the target base station.

Numerous other handoff scenarios can also be accommodated using the multiple security associations generated from the single instance of the session key generation protocol. For example, the handoff may be from a serving RNC to a target RNC, from a serving access network to a target access network, or from a serving gateway to a target gateway.

Depending upon the type of handoff, any unused security associations generated by the single instance of the session key generation protocol may be transferred, for example, from one RNC to another RNC, or from one access network to another access network, in conjunction with the handoff. The transfer may further comprise at least one PMK or at least a portion of at least one MSK. However, during such transfers, old key material that was already used for a previous security association need not be transferred, while the transfers of unused key material help to ensure seamless operation within the system.

Advantageously, the illustrative embodiments can provide significantly improved security in communication systems in which an eHRPD access network or other non-3GPP access network communicates with an LTE EPC, without unduly increasing system cost or complexity. For example, the delays and computational burdens associated with performance of a separate instance of the GKE protocol or other session key generation protocol for each security association are avoided, as are the security problems associated with generating secondary keys from primary keys. Also, the disclosed techniques facilitate session key determination under a variety of handoff scenarios, including handoffs between base stations, handoffs between RNCs or other access network elements, and handoffs between HSGWs or other IP gateways. The disclosed techniques can be implemented utilizing a modified GKE protocol, such as the above-noted MKEP, or other types of session key generation protocols that are suitably modified to generate multiple security associations per protocol instance.

Furthermore, the disclosed techniques can be adapted in a straightforward manner to numerous other communication system contexts, including by way of example any system comprising visited network and home network gateways where a mutually authenticated session key agreement protocol is utilized to establish session keys.

These and other features and advantages of the present invention will become more apparent from the accompanying drawings and the following detailed description.

DETAILED DESCRIPTION OF THE INVENTION

The present invention will be illustrated herein in conjunction with exemplary communication systems and associated techniques for generating and distributing session keys in conjunction with handoffs between pairs of base stations, access networks, IP gateways or other system elements. It should be understood, however, that the invention is not limited to use with the particular types of communication systems and session key generation and distribution processes disclosed. The invention can be implemented in a wide variety of other communication systems, using alternative processing steps. For example, although illustrated in the context of wireless cellular systems in which non-3GPP system elements such as an eHRPD access network communicate with 3GPP system elements such as an LTE EPC, the disclosed techniques can be adapted in a straightforward manner to a variety of other types of communication systems, including WiMAX systems, Wi-Fi systems, etc.

Figure 1:
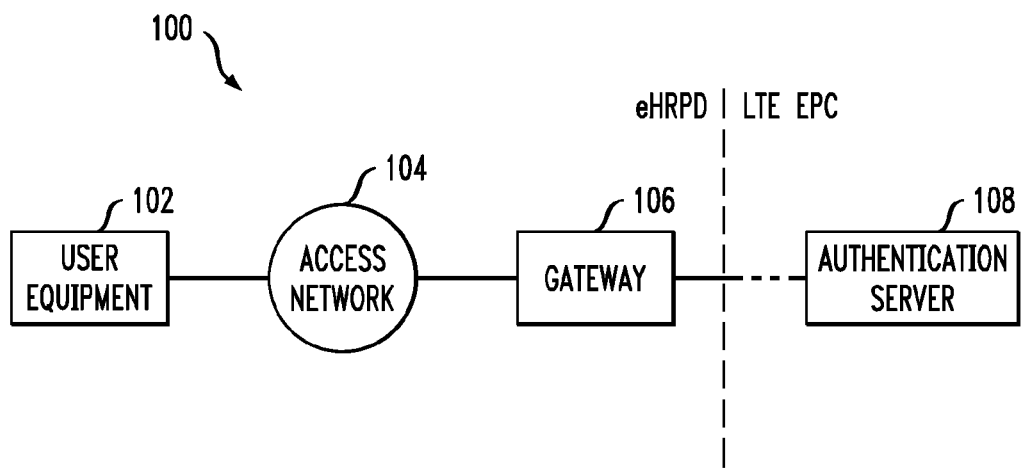
FIG. 1 is a block diagram of a communication system in an illustrative embodiment of the invention.

FIG. 1 shows a communication system 100 comprising user equipment (UE) 102 that communicates via access network 104 and gateway 106 with an authentication server 108. The user equipment 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop. Such devices are also referred to herein as "access terminals." The access network 104 may comprise a plurality of base stations and one or more associated radio network controllers (RNCs). The base stations and RNCs are logically separate entities, but in a given embodiment may be implemented in the same physical network element, such as, for example, a base station router or femto cellular access point.

In the present illustrative embodiment, the communication system 100 comprises a wireless cellular system. The access network 104 and gateway 106 comprise respective eHRPD access network and HSGW elements of an eHRPD network and the authenticator server 108 comprises an element of an LTE EPC. Thus, in this embodiment a non-3GPP portion of the system 100 comprising elements 104 and 106 interfaces with a 3GPP portion of the system comprising authentication server 108 and other 3GPP system elements. The authentication server 108 may comprise, for example, a 3GPP Authentication, Authorization and Accounting (AAA) server.

The FIG. 1 arrangement is just one exemplary configuration of a wireless cellular system, and numerous alternative configurations of system elements may be used. For example, although only single user equipment, access network, gateway and server elements are shown in the FIG. 1 embodiment, this is for simplicity and clarity of description only. A given alternative embodiment of the invention may of course include larger numbers of such system elements, as well as additional or alternative elements of a type commonly associated with conventional system implementations.

The gateway 106 serves as an authenticator in an authentication protocol carried out between the user equipment 102 and the authentication server 108 of the system 100. The system may be configured such that the access network 104 transmits an identifier of the gateway 106 to the user equipment 102 in conjunction with establishment of a communication session between the access network and the user equipment, in the manner described in U.S. patent application Ser. No. 12/401,287, filed Mar. 10, 2009 and entitled "Communication of Session-Specific Information to User Equipment from an Access Network," which is commonly assigned herewith and incorporated by reference herein. For example, as disclosed in the cited application, the authenticator identity or other session-specific information can be transmitted in a particularly efficient manner using a distinct message type of an existing eHRPD message format, such as, for example, a StorageBLOB Assignment message having a particular defined StorageBLOB type. It is to be appreciated, however, that the present invention does not require the use of such techniques.

As will be described in greater detail below, the present embodiment of the system 100 is configured such that a session key generation protocol carried out between the user equipment 102 and the access network 104 generates multiple security associations for a given instance of the protocol. The protocol may be a modified version of the conventional GKE protocol previously described herein. This approach advantageously allows a single instance of the session key generation protocol to provide different sets of session keys to accommodate multiple handoffs, thereby reducing the delays and computational burdens associated with handoff, while maintaining security and system performance.

The term "security association" as described herein is intended to encompass one or more session keys derived from a single PMK. For example, the multiple security associations in one or more of the illustrative embodiments comprise respective sets of session keys derived from a single PMK.

Figure 2:
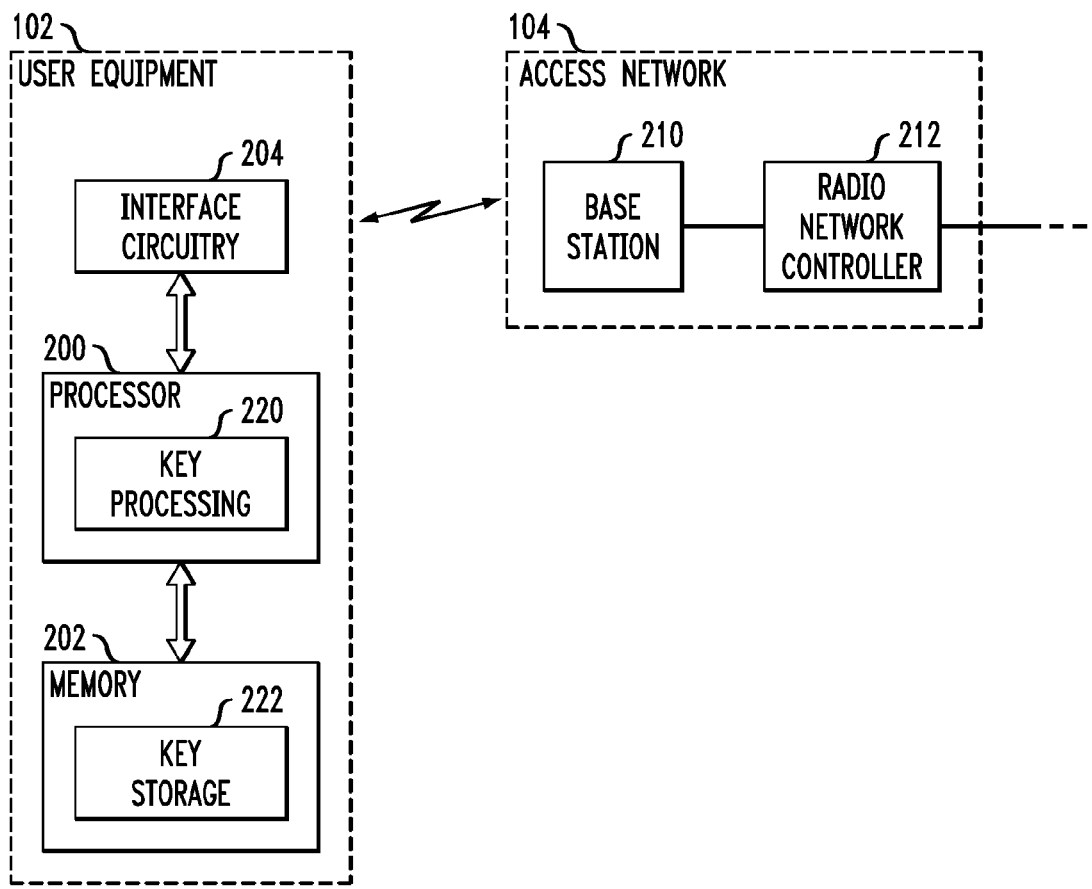
FIG. 2 shows a more detailed view of user equipment and access network elements in one possible implementation of the FIG. 1 system.

FIG. 2 shows a more detailed view of the user equipment 102 and access network 104 in the illustrative embodiment. The user equipment comprises a processor 200 coupled to a memory 202 and interface circuitry 204. The access network comprises a base station 210 and an RNC 212 coupled to the base station. Elements 210 and 212 of the access network 104 may each comprise processor, memory and interface circuitry elements, although such elements are not explicitly shown in the figure. Also, as indicated previously, the access network may comprise multiple base stations and RNCs.

The memory elements of the user equipment 102 and access network 104 may be used to store one or more software programs that are executed by the respective processors to implement the functionality described herein. For example, session key generation and distribution operations and other functionality as described in conjunction with FIGS. 5, 6 and 7 may be implemented in a straightforward manner using software code executed by processors of the user equipment, access network and other system elements. The memory elements such as memory 202 are examples of what are more generally referred to herein as computer-readable storage media that store executable program code. Such computer-readable storage media may comprise, for example, electronic memory such as random access memory (RAM) or read-only memory (ROM), magnetic memory, optical memory or other types of storage elements, as well as portions or combinations of such elements.

The processor elements such as processor 200 may comprise, for example, microprocessors, application-specific integrated circuits (ASICs), digital signal processors (DSPs) or other types of processing devices, as well as portions or combinations of such elements.

The interface circuitry elements such as interface circuitry 204 may comprise transceivers or other communication hardware or firmware that allows the associated system elements to communicate with one another in the manner described herein.

The processor 200 of the user equipment 102 includes a key processing element 220 that may be implemented at least in part in the form of software executed by the processor. The key processing element performs the user equipment operations of the protocols of FIGS. 5, 6 and 7. Similar key processing elements may be present in the processors of other system elements, such as base station 210, radio network controller 212, gateway 106, etc.

The memory 202 of the user equipment 102 includes a key storage element 222 that stores session keys generated using a modified GKE protocol as will be described in greater detail below. In one or more of the illustrative embodiment, the modified protocol is a protocol referred to as MKEP, although other protocols may be used to implement aspects of the present invention. Additional details regarding aspects of MKEP can be found in 3GPP2 Specification No. C.S0067-A, "Key Exchange Protocols for cdma2000 High Rate Packet Data Air Interface," Version 1.0, February 2009, which is incorporated by reference herein. Unlike the conventional GKE protocol, the MKEP protocol allows multiple session keys to be generated using a single protocol iteration or "instance." Thus, user equipment 102 and access network 104 can later switch to a new session key from the same set of session keys without having to perform another instance of the MKEP protocol. The instances are identified using respective unique values of a multi-bit session key index.

It should be noted that execution of a single "instance" of a given protocol does not require that the protocol be executed in its entirety, but instead is intended to encompass arrangements in which at least a portion of the protocol sufficient to produce a particular result is executed, such as a portion of the protocol sufficient to generate multiple security associations. Thus, an instance of a protocol can be executed without performing each and every process step that is associated with that particular protocol.

It is apparent from the FIG. 2 arrangement that user equipment 102 is configured for connection with access network 104 and vice-versa. Terms such as "connection," "connection between" and "coupled to" as used herein are intended to be construed generally, and accordingly should not be construed as requiring direct connection between the associated elements. Thus, user equipment 102 may be connected with access network 104 in a given embodiment via one or more other system elements. The same applies for connections between access network 104 and gateway 106, between gateway 106 and authentication server 108, and between other system elements. Also, elements such as gateway 106 and server 108 need not be implemented on separate stand-alone processing platforms, but could instead, for example, represent different functional portions of a single common processing platform.

Other network elements, such as gateway 106 and server 108, may each be configured to include a processor, memory and network interface, configured in a manner similar to that described above in the context of user equipment 102 of FIG. 2. It is to be appreciated that the term "network element" as used herein is intended to be construed broadly, so as to encompass communication system components of the type noted above as well as other types of processing devices associated with a given network.

Figure 3:
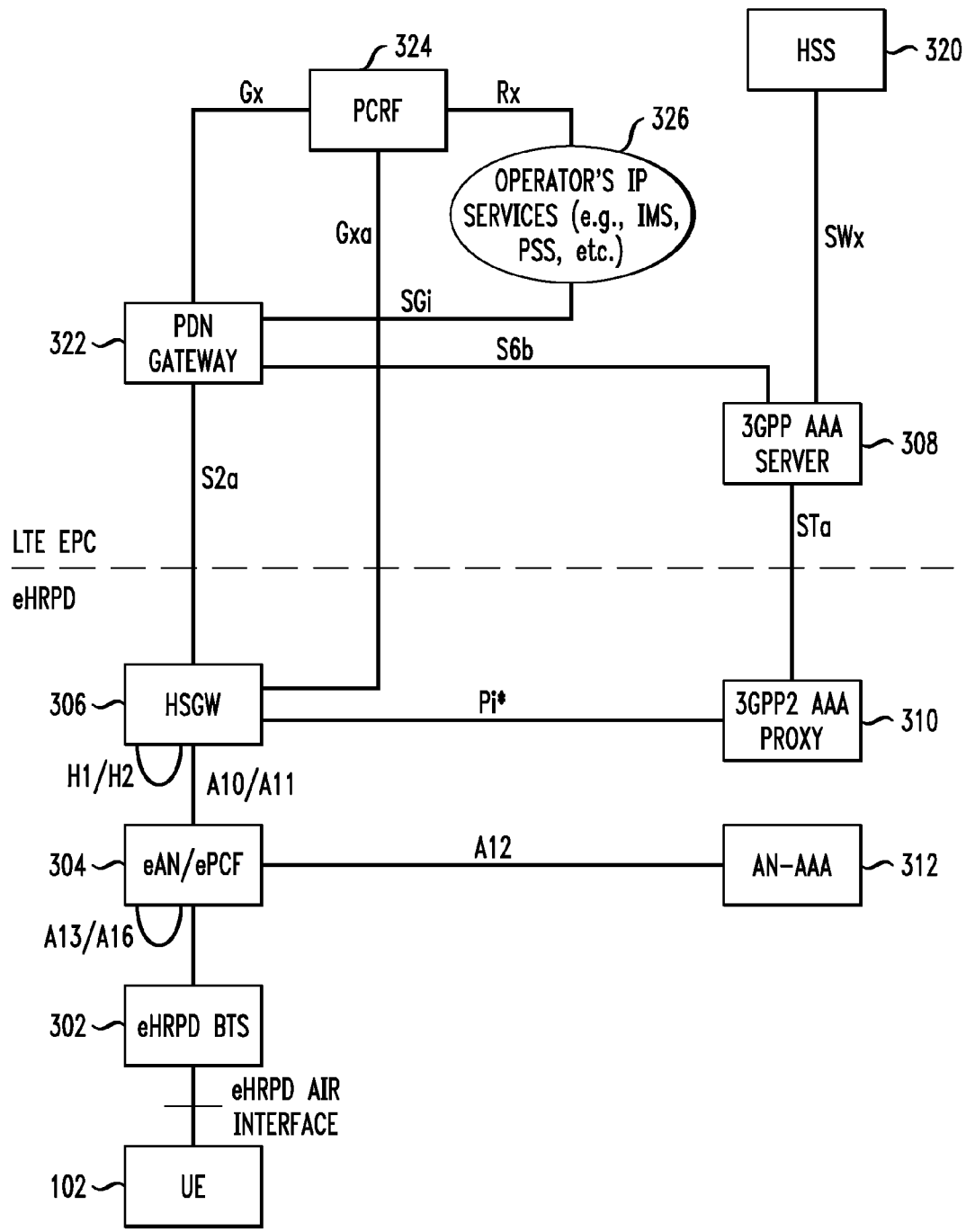
FIG. 3 shows another example of a communication system in an illustrative embodiment of the invention.

FIG. 3 shows another example of a communication system 300 in accordance with an illustrative embodiment of the invention. This exemplary system, like system 100 of FIG. 1, includes an eHRPD portion and an LTE EPC portion, with these portions being separated from one another by a dashed line.

In system 300, user equipment 102 communicates via an eHRPD air interface with an eHRPD base transceiver system (BTS) 302 coupled to an enhanced access network/enhanced packet control function (eAN/ePCF) 304. Elements 302 and 304 may be viewed as one example of the access network 104 in system 100 of FIG. 1. The eAN/ePCF element 304 is interfaced to the LTE EPC via an HSGW 306, which may be viewed as one example of the gateway 106 in system 100. The HSGW 306 communicates with a 3GPP AAA server 308 via a 3GPP2 AAA proxy 310 as shown. The 3GPP AAA server 208 may be viewed as one example of the authentication server 108 in system 100. The eAN/ePCF element 304 communicates with an access network AAA (AN-AAA) server 312.

The 3GPP portion of system 300 of FIG. 3 further comprises a Home Subscriber Server (HSS) 320 and a PDN gateway 322. The PDN gateway is coupled between the non-3GPP HSGW 306 and a number of 3GPP system elements including the 3GPP AAA server 308, a Policy and Charging Rules Function (PCRF) 324, and an Operator IP services element 326. The latter element may comprise, for example, IP Multimedia Subsystem (IMS), Packet-Switched Streaming (PSS), etc.

Conventional aspects of the operation of the various system elements and associated interfaces shown in FIG. 3, including the eHRPD air interface as well as the A10, A11, A12, A13, A16, H1, H2, Pi*, S2a, STa, S6b, SGi, Gx, Gxa and Rx interfaces, are described in detail in the above-cited 3GPP and 3GPP2 specification documents. See, for example, 3GPP2 Specification No. X.S0057-0, "E-UTRAN—HRPD Connectivity and Interworking: Core Network Aspects," which is incorporated by reference herein.

Figure 4:
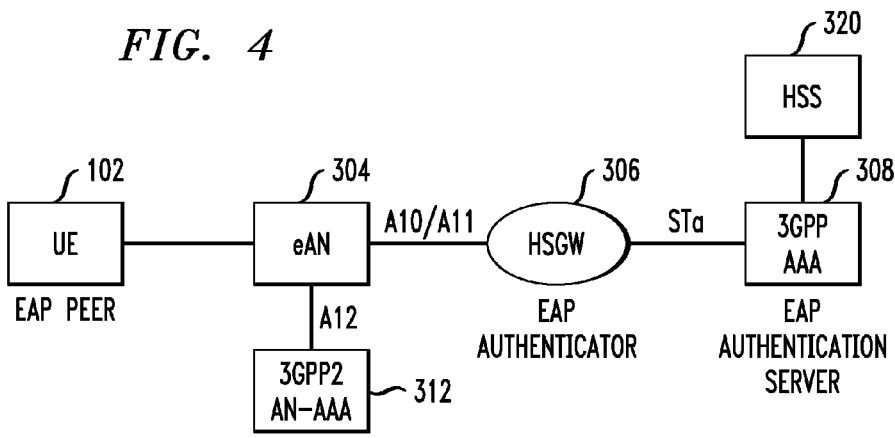
FIG. 4 is a simplified version of the FIG. 3 system diagram illustrating system elements associated with an authentication protocol carried out between user equipment and an authentication server of the system.

FIG. 4 shows certain elements of the system 300 that are associated with performance of an authentication protocol. The authentication protocol in this embodiment comprises an Extensible Authentication Protocol (EAP) in which user equipment 102 operates as an EAP peer, HSGW 306 operates as an EAP authenticator and 3GPP AAA server 308 operates as an EAP authentication server.

The authentication protocol allows the user equipment 102 and 3GPP AAA server 308 to authenticate one another via the HSGW 306 operating as the EAP authenticator. Conventional aspects of EAP authentication can be found in IETF RFC 3748, "Extensible Authentication Protocol (EAP)," B. Aboba, L. Blunk, J. Vollbrecht, J. Carlson and H. Levkowetz, June 2004, which is incorporated by reference herein. There are a number of different variants of EAP authentication. These include, for example, EAP-AKA authentication, where AKA denotes Authentication and Key Agreement. This variant is assumed to be utilized in the present embodiment, and is described in IETF RFC 4187, "Extensible Authentication Protocol Method for 3rd Generation Authentication and Key Agreement (EAP-AKA)," J. Arkko and H. Haverinen, January 2006, which is incorporated by reference herein. Another EAP variant, which binds the keys to the access network identity, is EAP-AKA' authentication, described in IETF Internet-Draft draft-arkko-eap-aka-kdf-10, "Improved Extensible Authentication Protocol Method for 3rd Generation Authentication and Key Agreement (EAP-AKA')," J. Arkko, V. Lehtovirta and P. Eronen, Nov. 18, 2008, which is incorporated by reference herein. These and other variants are examples of EAP authentication protocols that may be utilized in a given embodiment of the invention. Other embodiments may be implemented that utilize other types of authentication protocols, including non-EAP authentication protocols.

Once the user equipment and 3GPP AAA server have authenticated one another, and a determination has been made that the user equipment is authorized to access the LTE EPC portion of the system, the 3GPP AAA server sends a Master Session Key (MSK) to the HSGW 306 which as noted above acts as the EAP authenticator. The MSK is potentially based on an identifier of the HSGW. The access network 304 may be configured to provide the identity of the HSGW 306 to the user equipment such that it is available to the user equipment when the EAP access authentication is performed. This ensures that the HSGW will be uniquely identified and this unique identity can be incorporated into the authentication protocol. For example, the user equipment can utilize the HSGW identity as context information that is incorporated into the derivation of one or more keys in key derivation element 220. This binds the HSGW identity to the access authentication results. Additional details can be found in the above-cited U.S. patent application Ser. No. 12/401,287.

As described previously, the conventional GKE protocol utilizes a Pairwise Master Key (PMK) that is based on the MSK in order to generate a session key. Each instance of the GKE protocol generates only a single security association.

The present illustrative embodiment significantly improves the efficiency of the conventional approach by modifying the GKE protocol so as to generate multiple security associations between an access terminal such as user equipment 102 and an access network such as network 104 or 304, in a single invocation of GKE, without compromising security. Each such security association comprises a set of session keys and each session key may be of substantially the same length and security. The generation of multiple security associations may be achieved by introducing a multiplier in an otherwise conventional GKE protocol so as to generate a pseudorandom string which is a function of the multiplier and whose length is equal to the multiplier times a standard length, thereby providing multiple session keys of equal length and equal security. The use of a multiplier in combination with a pseudorandom function eliminates the need for additional randomness yet increases the output string length with little or no loss in security. As will be described in conjunction with FIGS. 5, 6 and 7 below, this provides considerable advantages in a variety of handoff scenarios, including handoffs between pairs of base stations, access networks or IP gateways.

In an illustrative embodiment, the modified GKE protocol comprises a protocol referred to herein as MKEP. It is to be appreciated that, although described in the context of particular protocols such as GKE and MKEP, the disclosed techniques can be adapted in a straightforward manner to a wide variety of other session key generation protocols. References herein to a "modified GKE protocol" should therefore be understood to encompass MKEP as well as other types of protocols that may be used to implement aspects of the invention.

As noted above, the user equipment 102 authenticates itself to the system using an EAP authentication protocol in which HSGW 306 operates as an EAP authenticator and 3GPP AAA server 308 operates as an EAP authentication server. Once the user equipment and 3GPP AAA server have authenticated one another, and a determination has been made that the user equipment is authorized to access the LTE EPC portion of the system, the 3GPP AAA server sends the MSK to the HSGW 306. The user equipment and the 3GPP AAA server thus agree on the MSK. The MSK is then used to compute multiple PMKs with each such PMK being used to compute session keys using a session key generation protocol that generates multiple security associations per protocol instance.

Figure 5:
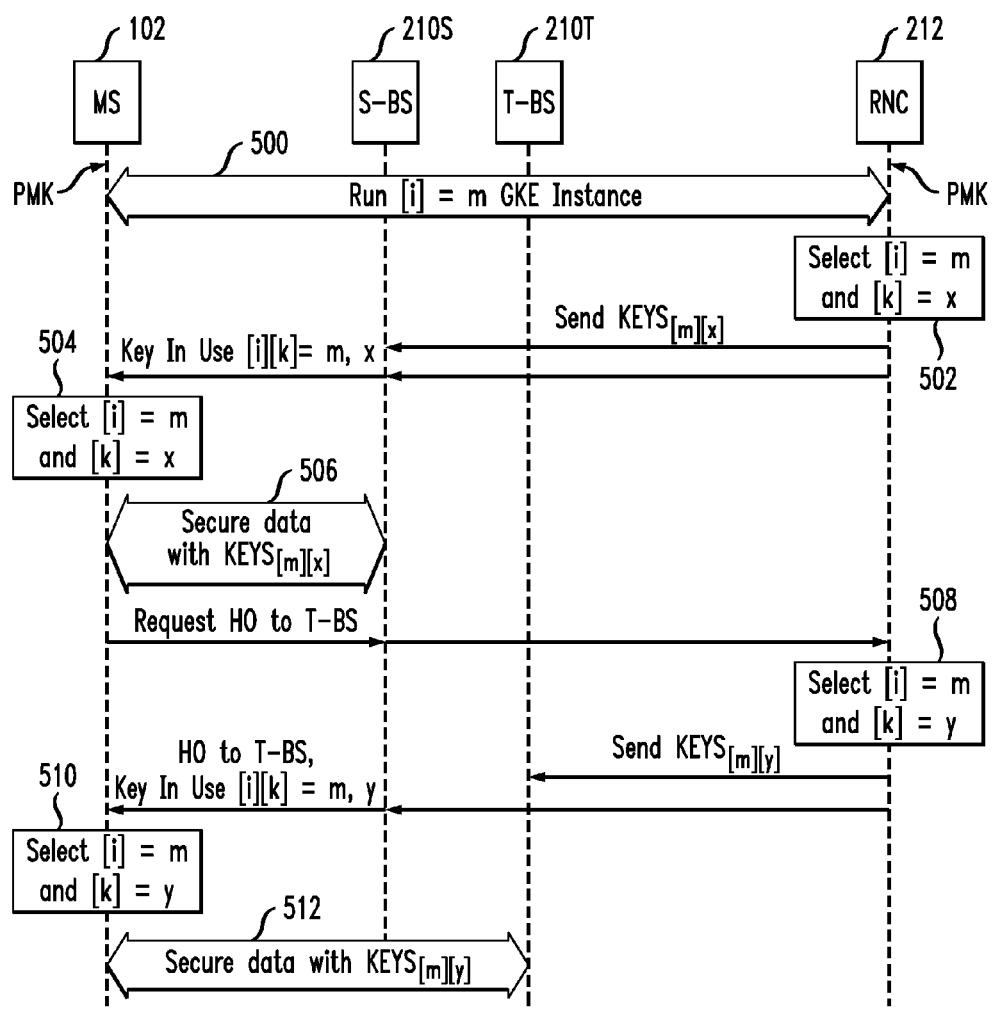
FIG. 5 shows a session key generation and distribution process in an illustrative embodiment involving a handoff from one base station to another base station.
Figure 6:
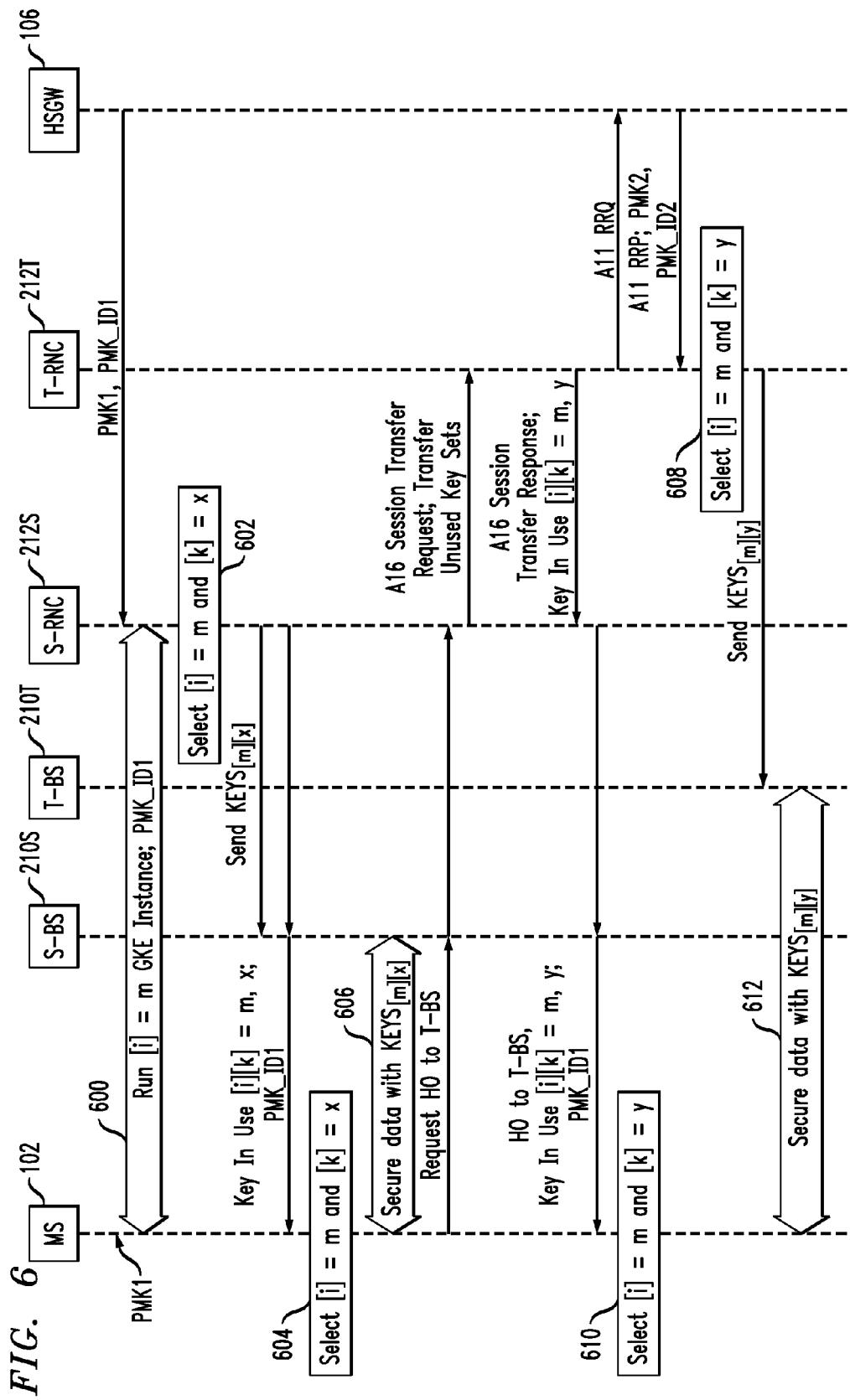
FIG. 6 shows a session key generation and distribution process in an illustrative embodiment involving a handoff from one RNC to another RNC.
Figure 7:
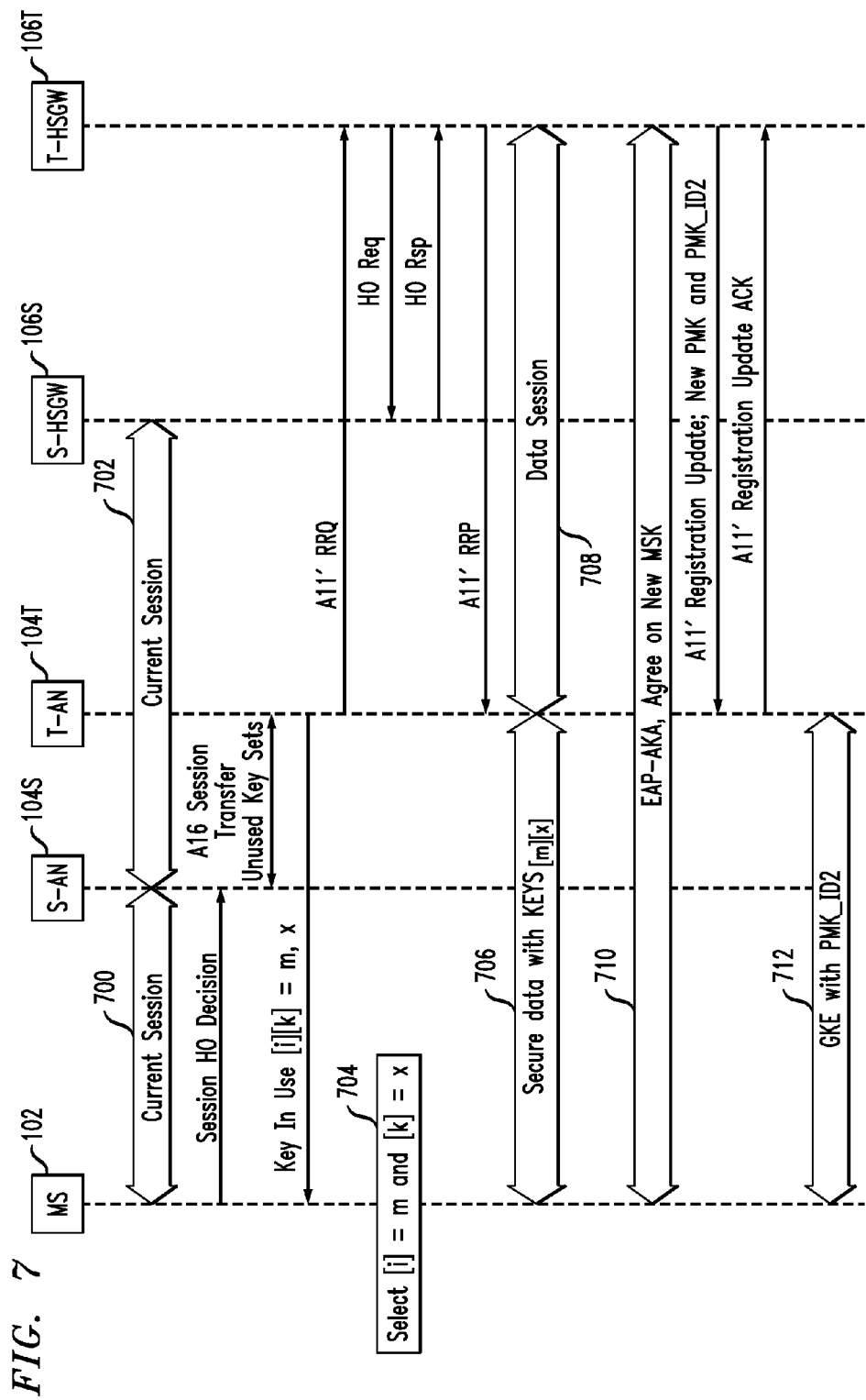
FIG. 7 shows a session key generation and distribution process in an illustrative embodiment involving a handoff from one HSGW to another HSGW.

FIGS. 5, 6 and 7 illustrate session key generation and distribution processes in the context of respective handoff scenarios. More particularly, FIG. 5 illustrates the process in the context of a handoff between base stations, also referred to as an inter-BS handoff. FIG. 6 illustrates the process in the context of a handoff between access network RNCs, also referred to as an inter-RNC handoff. FIG. 7 illustrates the process in the context of a handoff between HSGWs, also referred to as an inter-HSGW handoff. Each of these processes includes a single instance of the session key generation protocol that is used to generate multiple security associations, as well as signaling to indicate which of the security associations is to be utilized in the presence of the handoff. The descriptions of these figures assume by way of example that the authenticator is an HSGW element of the system and further that the session key generation protocol is run between the user equipment 102, illustratively a mobile station (MS), and an RNC element of an access network of the system, such as RNC 212 of access network 104.

The illustrative handoff scenarios are examples of active handoffs, as the handoffs occur in the context of an ongoing call or other communication session.

In a typical implementation, a session is initiated by the user equipment 102, although it is also possible for an access network element such as the RNC 212 to initiate the session. It is assumed that the user equipment and the RNC have respective identities and exchange such identities in conjunction with initiation of a session. It is further assumed that both the user equipment and the RNC have access to the above-noted PMKs.

Referring initially to FIG. 5, the process for an inter-BS handoff from a serving base station 210S to a target base station 210T is illustrated. Both the mobile station 102 and the RNC 212 have access to the PMK.

The index [i] in the figure is a 3-bit Session Key Index as defined in the above-cited 3GPP2 Specification No. C.S0067-A. The index [i] is used to identify a particular instance of the MKEP protocol, where i=0, 1, 2, . . . $i_{max}$. Since the index [i] is represented by three bits in the present embodiment, $i_{max}$=7, and eight different instances of the MKEP protocol can be uniquely identified.

The index [k] in the figure is a 3-bit NumSessionKey that identifies a particular portion of the key material generated by applying the above-described multiplier, where k=0, 1, 2, . . . $k_{max}$. Each such portion of the key material represents one of the multiple security associations mentioned previously. More particularly, the session key length in this embodiment is multiplied by a factor of $k_{max}$+1 to produce the multiple security associations, where as noted above $k_{max}$ denotes the maximum value of the index [k]. Thus, if the conventional key material length is 384 bits for a single instance of the GKE protocol, use of the multiplier will provide a total of $k_{max}$+1 384-bit portions of key material from the single instance of the MKEP protocol. Each such portion of the key material may be used to provide multiple keys, including, for example, an authentication key (e.g., AuthKey in MKEP) and an encryption key (e.g., EncKey in MKEP). One or more other keys, such as a message integrity code key (e.g., MICKey in MKEP), are also generated. The manner in which such keys may be generated in an illustrative embodiment is described in greater detail below in conjunction with FIG. 9.

Since [k] is represented by three bits in the present embodiment, $k_{max}$=7 and the application of the multiplier results in $k_{max}$+1=8 different security associations. The multiplier may thus be viewed as multiplying the single security association that would typically be produced by a conventional implementation of the GKE protocol by a factor of $k_{max}$+1 to produce $k_{max}$+1 different security associations. The index pair [i] [k] denotes a particular one of the security associations for a particular instance of the MKEP protocol. Thus, a set of keys [i] [k] refers to a set of keys associated with portion [k] of the key material generated using instance [i] of the MKEP protocol.

It is to be appreciated that the particular numbers of bits used to represent the indices [i] and [k] in the present embodiment are examples only, and other numbers of bits may be used to represent these indices, thereby accommodating more or fewer protocol instances, and providing larger or smaller multipliers.

In operation, one or more PMKs are generated by the HSGW 106 and sent to the RNC 212. The user equipment 102 also has access to the same PMKs. The RNC and the user equipment 102 then execute an instance of the modified GKE protocol, also referred to as MKEP in this embodiment, as indicated at step 500. This instance is identified by index [i]=m. The MKEP protocol utilizes the above-described multiplier to produce key material having $k_{max}+1$ portions corresponding to respective security associations uniquely identified by respective values of the index [k]. In the present embodiment, each such portion is 384 bits in length, and is used to provide three 128-bit keys. Thus, the single instance [i]=m of the MKEP protocol performed in step 500 produces $k_{max}+1=8$ different security associations, each identified by a unique value of the index [k].

Although only a single instance of the MKEP protocol is performed in the present embodiment, it is possible to perform multiple instances of the MKEP protocol, with each such instance identified by a different value of the index [i]. Again, MKEP should be viewed as an illustrative example of a "modified GKE protocol" as that phrase is used herein. The present invention does not require the use of MKEP.

In step 502, the RNC 212 selects instance [i]=m of the MKEP protocol and a particular security association [k]=x of instance [i]=m. The RNC then sends the associated keys to the serving base station 210S as indicated, and sends a Key In Use [i] [k] message to the user equipment 102 specifying the selected index values [i]=m and [k]=x. In step 504, the user equipment responsive to the message from the RNC also selects the instance [i]=m and security association [k]=x, and in step 506 uses the associated keys to secure data communication with the serving base station 210S. The term "data" as used herein is intended to be construed broadly, so as to encompass any type of information that it may be desirable to transmit between network elements in a secure manner, including, audio, video, etc.

The user equipment 102 then requests a handoff to the target base station 210T in the ongoing session. This request is communicated to the RNC 212 as indicated. The RNC in step 508 responsive to the handoff request selects a different security association [k]=y of instance [i]=m of the MKEP protocol. The RNC then sends the associated keys to the target base station 210T as indicated, and sends a Key In Use [i] [k] message to the user equipment specifying the selected index values [i]=m and [k]=y. An instruction to handoff to the target base station 210T is also provided to the user equipment. In step 510, the user equipment responsive to the message from the RNC also selects the instance [i]=m and security association [k]=y, and in step 512 uses the associated keys to secure data communication with the target base station 210T responsive to the handoff instruction.

Any of the various available security associations can be selected by the RNC 212 in steps 502 and 508. Once a given previously-selected security association is revoked in conjunction with a handoff, that security association is preferably purged from the list of available security associations.

When there are no more security associations available, the RNC and user equipment 102 can run one or more additional instances of the MKEP protocol so as to generate additional multiple security associations per protocol instance.

The number of session keys that need to be generated in one instance of the MKEP protocol may be communicated in a given embodiment using the three most significant bits of the Reserved field in an otherwise conventional Key Request message of a type described in the above-cited C.S0067 document, as indicated in the C.S0067-A document.

A particular value of index [k] may also be communicated using a most significant nibble of an otherwise conventional In Use Session Key Index message.

The selected index values [i] [k] may be communicated using a corresponding defined attribute of an otherwise conventional Attribute Update Request message sent on a control channel.

Thus, conventional messaging described in the C.S0067 document and other standards documents is adapted in the present embodiment to facilitate the GKE protocol modifications described above. Numerous alternative arrangements of standard or non-standard messaging may be used in a given embodiment of the present invention.

The session key generation and distribution process of FIG. 5 advantageously allows a single MKEP protocol instance to produce multiple security associations that can be distributed to individual base stations during handoffs, thus achieving cryptographic key separation between these base stations.

As mentioned previously, the techniques of the illustrative embodiments are also applicable to other handoff scenarios. Two additional exemplary handoff scenarios will now be described with reference to FIGS. 6 and 7.

With reference now to FIG. 6, the process for an inter-RNC handoff from a serving RNC 212S to a target RNC 212T is illustrated. The serving RNC is associated with serving base station 210S, and the target RNC is associated with target base station 210T. As there is a single HSGW 106 associated with both the serving and target RNCs, this particular handoff scenario is also referred to as an intra-HSGW inter-RNC handoff.

In operation, a first PMK denoted PMK1 is generated by the HSGW 106 and sent along with its identifier PMK_ID1 to the serving RNC 212S. Although not illustrated in the figure, multiple PMKs and corresponding PMK_IDs can be sent by the HSGW 106 to the serving RNC 212S. The user equipment 102 also has access to the same set of one or more PMKs including at least PMK1. The serving RNC 212S and the user equipment 102 then execute an instance of the modified GKE protocol, also referred to as MKEP in this embodiment, as indicated at step 600. This instance is identified by index [i]=m and is also associated with the identifier PMK_ID1. As in the FIG. 5 embodiment, the MKEP protocol utilizes the above-described multiplier to produce key material having $k_{max}+1$ portions corresponding to respective security associations uniquely identified by respective values of the index [k]. Each such portion is again assumed to be 384 bits in length, and is used to provide three 128-bit keys. Thus, the single instance [i]=m of the MKEP protocol performed in step 600 produces $k_{max}+1=8$ different security associations, each identified by a unique value of the index [k].

Again, although only a single instance of the MKEP protocol is performed in this embodiment, it is possible to perform multiple instances of the MKEP protocol, with each such instance identified by a different value of the index [i].

In step 602, the serving RNC 212S selects instance [i]=m of the MKEP protocol and a particular security association [k]=x of instance [i]=m. The serving RNC then sends the associated keys to the serving base station 210S as indicated, and sends a Key In Use [i] [k] message to the user equipment 102 specifying the selected index values [i]=m and [k]=x.

In step 604, the user equipment responsive to the message from the RNC also selects the instance [i]=m and security association [k]=x, and in step 606 uses the associated keys to secure data communication with the serving base station 210S.

The user equipment 102 then requests a handoff to the target base station 210T in the ongoing session. This request is communicated to the serving RNC 212S as indicated, and the serving RNC responds by sending an A16 Session Transfer Request to the target RNC 212T and transferring any unused key sets, including session keys as well as PMKs, to the target RNC. As indicated previously, such unused key sets correspond to respective security associations generated using the MKEP protocol and include PMKs previously received from the HSGW 106. The unused key sets may be transferred using A16 signaling.

A different security association [k]=y of instance [i]=m of the MKEP protocol is then selected. This selection may be performed by either the serving RNC 212S or the target RNC 212T. It is assumed for this embodiment that the selection is first made by the serving RNC, although this particular selection step is not shown in the diagram. The particular index values [i]=m and [k]=y of the selected security association may then be communicated from the serving RNC to the target RNC along with the unused key sets as part of the above-noted A16 signaling.

The target RNC 212T sends an A16 Session Transfer Response to the serving RNC 212S, along with a Key In Use [i][k] message specifying the selected index values [i]=m and [k]=y. This information is sent to the user equipment 102, along with an instruction to handoff to the target base station 210T.

The target RNC 212T can request one or more new PMKs from the HSGW 106 using an A11 Registration Request (RRQ) message. The HSGW responds with an A11 Registration Reply (RRP) message including a second PMK denoted as PMK2 and having an identifier PMK_ID2. Similarly, the HSGW may include multiple PMKs in the same A11 RRP message.

Assuming that the original selection of the new security association was made by the serving RNC 212S, the target RNC 212T selects that same security association in step 608, and sends the associated keys to the target base station 210T.

In step 610, the user equipment 102 also selects the instance [i]=m and security association [k]=y, and in step 612 uses the associated keys to secure data communication with the target base station 210T responsive to the handoff instruction.

It should be noted that the ordering of the steps of the FIG. 6 process and other processes described herein may be varied in alternative embodiments.

When there are no more security associations available in the multiple security associations generated in step 600, the target RNC 212T and user equipment 102 will run an additional instance of the MKEP protocol using PMK2 so as to generate additional multiple security associations per protocol instance. Thus, the target RNC does not need to establish new security associations until all unused security associations previously generated in step 600 are revoked.

FIG. 7 shows the process for an inter-HSGW handoff from a serving HSGW 106S to a target HSGW 106T. The serving HSGW is associated with serving access network 104S, and the target HSGW is associated with target access network 104T. As there are two HSGWs associated with the respective serving and target access networks, this particular handoff scenario is also referred to as an inter-HSGW active handoff.

The process begins with a current session that is being carried out between user equipment 102 and serving access network 104S as indicated at 700 and between the serving access network and the serving HSGW 106S as indicated at 702.

The user equipment 102 then informs the serving access network 104S of a decision to handoff to the target access network 104T associated with the target HSGW 106T. The serving access network responds by sending an A16 Session Transfer Request to the target access network and transferring any unused key sets to the target access network. As indicated previously, such unused key sets correspond to respective security associations generated using a previously-performed instance of the MKEP protocol and also include one or more PMKs. The unused key sets may be transferred using A16 signaling.

The selection of a new security association may be made by the serving access network 104S or the target access network 104T. In this embodiment, it is assumed that the selection is made by the target access network, although the selection step is not explicitly shown in the diagram. The target access network sends a Key In Use [i][k] message to the user equipment 102 specifying the selected index values [i]=m and [k]=x, assuming also for this embodiment that this particular security association was not previously selected.

The target access network 104T sends an A11' RRQ message to the target HSGW 106T. The target HSGW sends a handoff request to the serving HSGW 106S, and responds with a handoff response granting the handoff request. The serving HSGW includes the unused portions of the MSK and any associated Sub-MSKs in the handoff response. This information is communicated to the target access network in an A11' RRP message.

In step 704, the user equipment 102 also selects the instance [i]=m and security association [k]=x, and in step 706 uses the associated keys to secure data communication with the target access network 104T. A data session 708 is initiated between the target access network and the target HSGW 106T.

Figure 8:
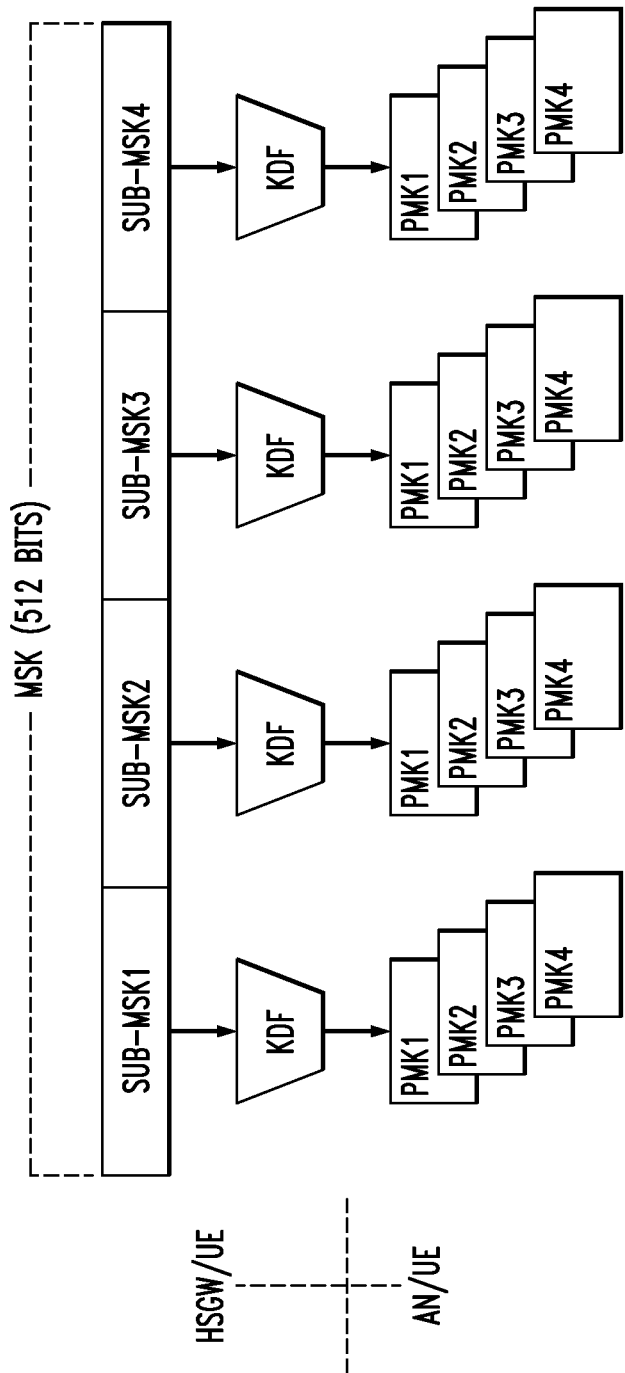
FIG. 8 illustrates an example of a technique for generation of PMKs from an MSK.

In step 710, the user equipment 102 and the target HSGW 106T execute an instance of the EAP-AKA authentication protocol to agree on a new MSK. The new MSK is used to generate multiple Sub-MSKs, each of which is used to generate multiple PMKs, as is illustrated in FIG. 8. A given such PMK is denoted PMK2 and has identifier PMK_ID2. The target HSGW sends an A11' Registration Update message to the target access network 104T, along with PMK2 and its associated identifier PMK_ID2. The target access network 104T sends a corresponding acknowledgement back to the target HSGW.

When the remaining unused key sets are fully depleted, the target access network 104T initiates an instance of the MKEP protocol with user equipment 102 in step 712 to generate multiple security associations based on the new PMK.

Exemplary techniques for generating PMKs from an MSK and for generating multiple sets of session keys from a PMK will now be described with reference to FIGS. 8 and 9, respectively. It should be understood that these particular key generation techniques are presented by way of illustrative example only, and other types of key generation techniques may be used in other embodiments of the invention.

Referring now to FIG. 8, a process of generating multiple sets of PMKs from a single MSK is shown. The MSK in this example is 512 bits in length, and comprises four sub-MSK portions denoted Sub-MSK1, Sub-MSK2, Sub-MSK3 and Sub-MSK4. Each such portion is processed using a designated KDF as shown to generate a corresponding set of four PMKs denoted PMK1, PMK2, PMK3 and PMK4. As previously indicated, each such PMK may be used to derive keys such as an AuthKey, EncKey and MICKey.

In this embodiment, as a result of successful access authentication in accordance with the EAP-AKA protocol, the EAP-AKA' protocol, or another authentication protocol, both the UE and the HSGW obtain the MSK. The UE and HSGW separate the 512 bits of the MSK into four equal portions of 128 bits each, i.e., the four Sub-MSKs. The UE and HSGW use each Sub-MSK to generate the four PMKs as follows:

PMK1=HMAC-SHA-256(Sub-MSK, pmk@hrpd.3gpp2, 0x01), [0:127]
PMK2=HMAC-SHA-256(Sub-MSK, "pmk@hrpd.3gpp2", 0x01) [128:255],
PMK3=HMAC-SHA-256(Sub-MSK, "pmk@hrpd.3gpp2", 0x02) [0:127],
PMK4=HMAC-SHA-256(Sub-MSK, "pmk@hrpd.3gpp2", 0x02) [128:255],
where the key label "pmk@hrpd.3gpp2" is set to ASCII strings without NULL termination. The UE and HSGW can pre-compute the PairwiseMasterKeyID associated with each PMK as follows:
PairwiseMasterKeyID=ehmacsha (key=PairwiseMasterKey, key_length=length of Pairwise-MasterKey in units of octets, message="PairwiseMasterKeyID", message_length=length of message in units of bits, message_offset=0, MAC_length=16)
where the ehmacsha function is specified in 3GPP2 Specification No. S.S0078-B, "Common Security Algorithms," Version 1.0, February 2008, which is incorporated by reference herein.

In addition, the UE and HSGW can also pre-compute the PMKs and PairwiseMasterKeyIDs associated with the other Sub-MSKs. This pre-computation of PMKs and PairwiseMasterKeyIDs enables the UE to identify the PMK it needs to use upon receiving a request from the access network to derive session keys for access security.

Figure 9:
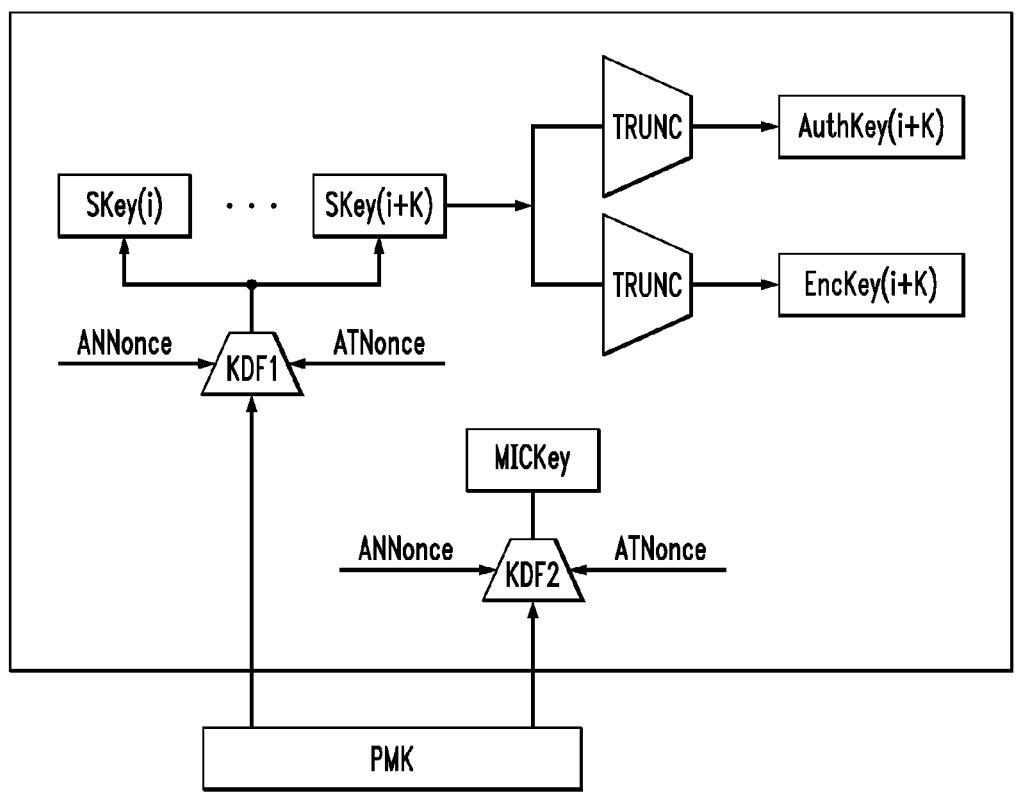
FIG. 9 illustrates an example of a technique for generation of multiple sets of session keys from a single PMK.

As a result of successful MKEP message exchange, both the UE and the eAN generate session keys in the manner illustrated in FIG. 9. This figure shows a process of generating multiple session keys from a given PMK which may correspond to one of the PMKs generated in the FIG. 8 process.

The eAN and the UE use PMK, ANNonce and ATNonce as an input to generate SKey(s) and MICKey, using KDFs denoted as KDF1 and KDF2. ANNonce and ATNonce are corresponding fields of MKEP messages KeyRequest and KeyReponse, respectively. Each SKey is then truncated into an authorization key (AuthKey) and an encryption key (EncKey). The UE and the eAN derive SKey[i], where i is SessionKeyIndex field of the corresponding MKEP KeyRequest message, as follows:
Set k and m to an 8-bit number with value zero;
while k<(NumSessionKeys+1), where NumSessionKeys is a field of the corresponding KeyRequest message:
  Set SKeyTemp[i+k] to $N_{MKEPSessionKeyLen}$ least significant bits of {SKeyTemp[i+k]|128 most significant bits of ehmacsha(key=PairwiseMasterKey, key_length=length of PairwiseMasterKey in units of octets, message=ATNonce|ANNonce|m, message_length=length of message in units of bits, message_offset=0, MAC_length=16)}, where m is represented as an 8-bit field;
  Set m to m+1;
  Set k to k+1.
The UE and the eAN derive the MICKey[i], where i is the SessionKeyIndex field of the corresponding KeyRequest message, as follows:
Set MICKey[i] to the 128 most significant bits of {ehmacsha256(key=PairwiseMasterKey, key_length=length of PairwiseMasterKey in units of octets, message=ATNonce|ANNonce, message_length=length of message in units of bits, message_offset=0, MAC_length=16)}, where the ehmacsha256 function is specified in the above-cited 3GPP2 Specification No. S.S0078-B.

The keys used for authentication and encryption are generated from the session key. The keys derived from SKey[i] are referred to by the subscript i. The AN and the UE set FACAuthKey[i], FPCAuthKey[i], RACAuthKey[i], and RPCAuthKey[i] to SKey[i] [127:0], where i is the session key index. The AN and the UE set FACEncKey[i], FPCEncKey[i], RACEncKey[i], and RPCEncKey[i] to SKey[i] [255:128], where i is the session key index.

Additional details regarding key generation processes suitable for use with embodiments of the present invention may be found in the above-cited C.S0067-A document. Again, the examples described above are for purposes of illustration only, and should not be viewed as requirements of the invention.

The illustrative embodiments provide an improved security framework for key generation and distribution in eHRPD systems as well numerous other types of communication systems. These embodiments substantially improve system security and performance in the presence of a wide variety of handoff scenarios, without unduly increasing system cost or complexity. For example, the delays and computational burdens associated with performance of a separate instance of the GKE protocol or other session key generation protocol for each security association are avoided, as are the security problems associated with generating secondary keys from primary keys. Also, the illustrative embodiments can be implemented with only minimal changes to the existing 3GPP2 standards such as the above-cited C.S0067 standard.

The use of a multiplier in a session key generation protocol to generate multiple security associations for a single instance of the protocol can improve the efficiency of any symmetric key based authentication and key exchange process. The generation of multiple security associations per protocol instance is particularly useful in wireless applications in which movement of mobile stations leads to frequent handoffs. The disclosed techniques facilitate the provision of multiple security associations of substantially equal length and security strength for use with respective handoffs.

In the illustrative embodiments, the security associations all provide session keys of substantially equivalent cryptographic strength. Also, the multiplier is simple to implement through modification of existing code. For example, it may be implemented by specifying a data structure which informs the key derivation function how many security associations and how many keys per security association. This data structure may be used as an input to a pseudorandom function which is used to generate keys. In effect, such an implementation makes a multiple number of function calls with the particular number of function calls being given by the value of the multiplier as encoded in the data structure. Conventional pseudorandom functions such as those used in the GKE protocol can therefore be reused in embodiments of the invention. Thus, a given embodiment can simply specify the data structure for the multiplier and refer the pseudorandom function to the data structure for input. Again, the result is multiple security associations of substantially equal security.

As indicated previously, the present invention is not limited to the eHRPD-LTE context and the disclosed techniques can be adapted in a straightforward manner to a wide variety of other communication system contexts. For example, the disclosed techniques can be applied to any communication system context that involves interworking between two networks that utilize a master security association key generated from any link layer authentication protocol.

As a more particular example of an alternative communication system embodiment of the present invention, the eHRPD-LTE embodiments described in conjunction with FIGS. 1-3 may be generalized to a system comprising a gateway in a visited network and a gateway in a home network. In this context, the disclosed techniques may be implemented using mutually authenticated session key agreement protocols of any type. The visited network gateway may be the same as the home network gateway in situations in which a mobile user is registering within its home domain.

It should therefore again be emphasized that the various embodiments described herein are presented by way of illustrative example only, and should not be construed as limiting the scope of the invention. For example, alternative embodiments of the invention can utilize different communication system configurations, session key generation protocols, process steps, messaging protocols and message formats than those described above in the context of the illustrative embodiments. These and numerous other alternative embodiments within the scope of the appended claims will be readily apparent to those skilled in the art.

What is claimed is:

1. A method comprising:
executing in user equipment of a communication system a designated portion of a single instance of a session key generation protocol in order to generate a plurality of security associations between the user equipment and a first network element of the communication system;
utilizing a first one of the security associations to secure data sent between the user equipment and the first network element in an ongoing communication;
in conjunction with a handoff of the ongoing communication from the first network element to a second network element, selecting another one of the security associations, and utilizing the selected other one of the security associations to secure data sent between the user equipment and the second network element in the ongoing communication.

2. The method of claim 1 wherein the step of selecting another one of the security associations is performed in the user equipment responsive to a message received from at least one of the first and second network elements.

3. The method of claim 2 wherein the message specifies a value of a first index identifying a particular instance of the session key generation protocol and a value of a second index identifying a particular security association associated with the particular instance of the session key generation protocol.

4. The method of claim 1 wherein the security associations comprise respective sets of session keys derived from a single pairwise master key.

5. The method of claim 1 wherein the session key generation protocol comprises a protocol that is modified to generate the multiple security associations but absent modification to generate the multiple security associations, the protocol would otherwise generate only a single security association for a given single instance of the session key generation protocol.

6. The method of claim 5 wherein the session key generation protocol comprises an Multi-Key Key Exchange Protocol (MKEP).

7. The method of claim 5 wherein the modified protocol applies a multiplier to key material in combination with a pseudorandom function to increase a length of said key material by a factor given by the multiplier.

8. The method of claim 7 wherein the multiplier specifies a total number of said plurality of security associations produced by execution of the single instance of the session key generation protocol.

9. The method of claim 1 wherein unused security associations generated by the single instance of the session key generation protocol are transferred from one radio network controller to another radio network controller, or from one access network to another access network, in conjunction with the handoff, said transfer further comprising at least one pairwise master key or at least a portion of at least one master session key, and eliminating a need for execution of an additional instance of the protocol.

10. The method of claim 1 wherein the first and second network elements comprise respective serving and target base stations and the handoff is from the serving base station to the target base station.

11. The method of claim 1 wherein the handoff is from a serving access network element to a target access network element.

12. The method of claim 1 wherein the handoff is from a serving gateway to a target gateway.

13. The method of claim 1 wherein the communication system comprises a non-3GPP access network and a serving gateway configured to provide an interface between the non-3GPP access network and an evolved packet core of an Long Term Evolution (LTE) network.

14. A non-transitory computer-readable storage medium having embodied therein executable program code that when executed by a processor of the user equipment causes the user equipment to perform the steps of the method of claim 1.

15. An apparatus comprising:
user equipment configured for communication with an access network of a communication system;
the user equipment being operative to execute a designated portion of a single instance of a session key generation protocol in order to generate a plurality of security associations between the user equipment and a first network element of the communication system;
wherein the user equipment utilizes a first one of the security associations to secure data sent between the user equipment and the first network element in an ongoing communication; and
wherein in conjunction with a handoff of the ongoing communication from the first network element to a second network element, the user equipment selects another one of the security associations, and utilizes the selected other one of the security associations to secure data sent between the user equipment and the second network element in the ongoing communication.

16. The apparatus of claim 15 wherein the user equipment comprises:
a processor;
a memory coupled to said processor; and
a network interface adapted for communication with the access network.

17. A method comprising:
executing in a network element of a communication system a designated portion of a single instance of a session key generation protocol in order to generate a plurality of security associations between the network element and user equipment of the communication system;
selecting one of the security associations to utilize for data security in an ongoing communication involving the user equipment; and
responsive to a handoff request, selecting another one of the security associations to utilize for data security in the ongoing communication.

18. The method of claim 17 wherein the network element comprises a radio network controller of an access network of the communication system.

19. The method of claim 17 wherein the step of selecting one of the security associations is performed in a first network element and the step of selecting another one of the security associations is performed in a second network element.

20. The method of claim 19 further comprising the step of transferring unused security associations generated by the single instance of the session key generation protocol from the first network element to the second network element responsive to the handoff request.

21. A non-transitory computer-readable storage medium having embodied therein executable program code that when executed by a processor of the network element causes the network element to perform the steps of the method of claim 17.

22. An apparatus comprising:
a network element configured for communication with user equipment of a communication system;
the network element being operative to execute a designated portion of a single instance of a session key generation protocol in order to generate a plurality of security associations between the network element and the user equipment;
wherein the network element is configured to select one of the security associations to utilize for data security in an ongoing communication involving the user equipment; and
wherein responsive to a handoff request another one of the security associations is selected to utilize for data security in the ongoing communication.

23. The apparatus of claim 22 wherein the network element comprises a radio network controller of an access network of the communication system.

* * * * *